(12) United States Patent
Qu et al.

(10) Patent No.: US 7,460,920 B1
(45) Date of Patent: Dec. 2, 2008

(54) DETERMINING SCHEDULING PRIORITY USING FABRICATION SIMULATION

(75) Inventors: Peng Qu, Austin, TX (US); Vijay Devarajau, Arlington, TX (US); Michael A. Hillis, Austin, TX (US); Dax Middlebrooks, Kyle, TX (US); Farzad Sadjadi, Austin, TX (US); Chandrashekar Krishnaswamy, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 374 days.

(21) Appl. No.: 11/359,110

(22) Filed: Feb. 22, 2006

(51) Int. Cl.
*G06F 19/00* (2006.01)

(52) U.S. Cl. ..................... 700/101; 700/100

(58) Field of Classification Search ............... 700/101
See application file for complete search history.

(56) References Cited

U.S. PATENT DOCUMENTS

| | | | | |
|---|---|---|---|---|
| 5,751,580 A | * | 5/1998 | Chi | 700/101 |
| 2003/0130756 A1 | * | 7/2003 | Baweja et al. | 700/100 |
| 2005/0015168 A1 | * | 1/2005 | Cho | 700/101 |

* cited by examiner

*Primary Examiner*—Ryan A Jarrett
(74) *Attorney, Agent, or Firm*—Williams, Morgan & Amerson, P.C.

(57) ABSTRACT

A method for processing workpieces in a process flow including a plurality of operations includes employing a fabrication simulation model of the process flow to determine an estimated completion time for a selected workpiece. The fabrication simulation model simulates the processing of the selected workpiece and other workpieces in the process flow through the plurality of operations. The priority of the selected workpiece is adjusted based on a comparison between a target completion time for the selected workpiece and the estimated completion time.

27 Claims, 4 Drawing Sheets

DETERMINING SCHEDULING PRIORITY USING FABRICATION SIMULATION

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

This invention pertains to automated manufacturing environments, such as semiconductor manufacturing, and, more particularly, to a method and apparatus for determining scheduling priority using discrete event system simulation at the fabrication level.

Growing technological requirements and the worldwide acceptance of sophisticated electronic devices have created an unprecedented demand for large-scale, complex, integrated circuits. Competition in the semiconductor industry requires that products be designed, manufactured, and marketed in the most efficient manner possible. This requires improvements in fabrication technology to keep pace with the rapid improvements in the electronics industry. Meeting these demands spawns many technological advances in materials and processing equipment and significantly increases the number of integrated circuit designs. These improvements also require effective utilization of computing resources and other highly sophisticated equipment to aid, not only design and fabrication, but also the scheduling, control, and automation of the manufacturing process.

Turning first to fabrication, integrated circuits, or microchips, are manufactured from modern semiconductor devices containing numerous structures or features, typically the size of a few micrometers or less. The features are placed in localized areas of a semiconducting substrate, and are either conductive, non-conductive, or semi-conductive (i.e., rendered conductive in defined areas with dopants). The fabrication process generally involves processing a number of wafers through a series of fabrication tools. Each fabrication tool performs one or more of four basic operations discussed more fully below. The four basic operations are performed in accordance with an overall process to finally produce the finished semiconductor devices.

Integrated circuits are manufactured from wafers of a semiconducting substrate material. Layers of materials are added, removed, and/or treated during fabrication to create the integrated, electrical circuits that make up the device. The fabrication essentially comprises the following four basic operations:

layering, or adding thin layers of various materials to a wafer from which a semiconductor is produced;
  patterning, or removing selected portions of added layers;
  doping, or placing specific amounts of dopants in selected portions of the wafer through openings in the added layers; and
  heat treating, or heating and cooling the materials to produce desired effects in the processed wafer.

Although there are only four basic operations, they can be combined in hundreds of different ways, depending upon the particular fabrication process.

Efficient management of a facility for manufacturing products, such as semiconductor chips, requires monitoring of various aspects of the manufacturing process. For example, it is typically desirable to track the amount of raw materials on hand, the status of work-in-process and the status and availability of tools and tools at every step in the process. One of the most important decisions in controlling the manufacturing process is selecting which lot should run on each process tool at any given time. Additionally, most tools used in the manufacturing process require scheduling of routine preventative maintenance (PM) procedures and equipment qualification (Qual) procedures, as well as other diagnostic and reconditioning procedures that must be performed on a regular basis, such that the performance of the procedures does not impede the manufacturing process itself.

One approach to this issue implements an automated "Manufacturing Execution System" (MES). An automated MES enables a user to view and manipulate, to a limited extent, the status of tools, or "entities," in a manufacturing environment. In addition, an MES enables the dispatching and tracking of lots or work-in-process through the manufacturing process to enable resources to be managed in the most efficient manner. Specifically, in response to MES prompts, a user inputs requested information regarding work-in-process and entity status. For example, when a user performs a PM on a particular entity, the operator logs the performance of the PM (an "event") into an MES screen to update the information stored in the database with respect to the status of that entity. Alternatively, if an entity is to be taken down for repair or maintenance, the operator logs this information into the MES database, which then prevents use of the entity until it is subsequently logged back up to a production ready state.

Although MES systems are sufficient for tracking lots and tools, such systems suffer several deficiencies. Current MES systems largely depend on manufacturing personnel for monitoring factory state and initiating activities at the correct time. One technique for actively affecting the flow of lots through the fabrication process is to assign each lot a priority, which represents the importance assigned to completing the particular lot with respect to all other lots being fabricated. Generally, if multiple lots having different priorities seek to be processed by a particular entity, the lot with the higher priority is scheduled to be processed first. Typically, a particular lot may be expedited by manually increasing its priority, for example, to the highest priority.

Changes to lot priority can affect the production flow, especially the on-time delivery of other lots. Typically, after the priority of a lot is changed, it remains at the new level for the remainder of its fabrication. Hence, changing a particular lot to have the highest priority may result in the lot being completed much earlier than is actually required.

Changing lot priority is identified as a major disruption in the semiconductor Industry. Lots of the highest priority have the following characteristics: they are allowed to reserve downstream tools; they may be manually carried for both inter- and intra-bay transportation; they may have to be batched alone for lots of new technology, or they can be batched alone without waiting for other incoming lots; they may be allowed to break setup (i.e., change the recipe of a particular entity); and they may be allowed to break cascading (i.e., change recipe in a multi-chamber tool causing chamber idle time).

Although the number of lots of highest priority is typically very limited in the fabrication facility, they bring significant impacts to the production flow. For bottleneck tools (e.g. a photolithography stepper), the capacity loss of tool reservations by priority lots is not recoverable. Hence, the reserving of bottleneck tools directly reduces throughput. For batching operations, tool reservations or single lot batches appreciably increases the average cycle time of production lots, as they may have to wait an extended time period (e.g., 12 hours) to get the tool. Such reservations also reduce tool utilization (e.g., a furnace is typically capable of processing six lots simultaneously, but only one priority lot in the same amount of time if a reservation is made). For steppers, priority lots also reserve reticles when reserving the tool, which expands the effect to other tools that may have to unload the reticle sets and experience unnecessary setups. As priority lots break cascading, it reduces the throughput of the overall manufacturing facility as well as increases the fluctuation of production flow.

Hence, changing lot priority is challenging because the effects of changing lot priorities are felt across the whole production environment and have an extended time horizon. In other words, the effects are not instantaneous and can last as long as a few months. Also, the effects of lot priority changes present different issues for different types of tools. Determining lot priorities requires both a global view of the fabrication facility and local views at the tool level to consider their correlation. Further, lot priority should be determined with the consideration of other priority lots and their status.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art. The present invention is directed to overcoming, or at least reducing the effects of, one or more of the problems set forth above.

BRIEF SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

One aspect of the present invention is seen in a method for processing workpieces in a process flow including a plurality of operations. The method includes employing a fabrication simulation model of the process flow to determine an estimated completion time for a selected workpiece. The fabrication simulation model simulates the processing of the selected workpiece and other workpieces in the process flow through the plurality of operations. The priority of the selected workpiece is adjusted based on a comparison between a target completion time for the selected workpiece and the estimated completion time.

Another aspect of the present invention is seen in a system including a plurality of tools and a priority analyzer. The tools process workpieces in a process flow including a plurality of operations. The priority analyzer is operable employ a fabrication simulation model of the process flow to determine an estimated completion time for a selected workpiece. The fabrication simulation model simulates the processing of the selected workpiece and other workpieces in the process flow through the plurality of operations. The priority analyzer adjusts the priority of the selected workpiece based on a comparison between a target completion time for the selected workpiece and the estimated completion time.

BRIEF DESCRIPTION OF THE SEVERAL VIEWS OF THE DRAWINGS

The invention will hereafter be described with reference to the accompanying drawings, wherein like reference numerals denote like elements, and.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
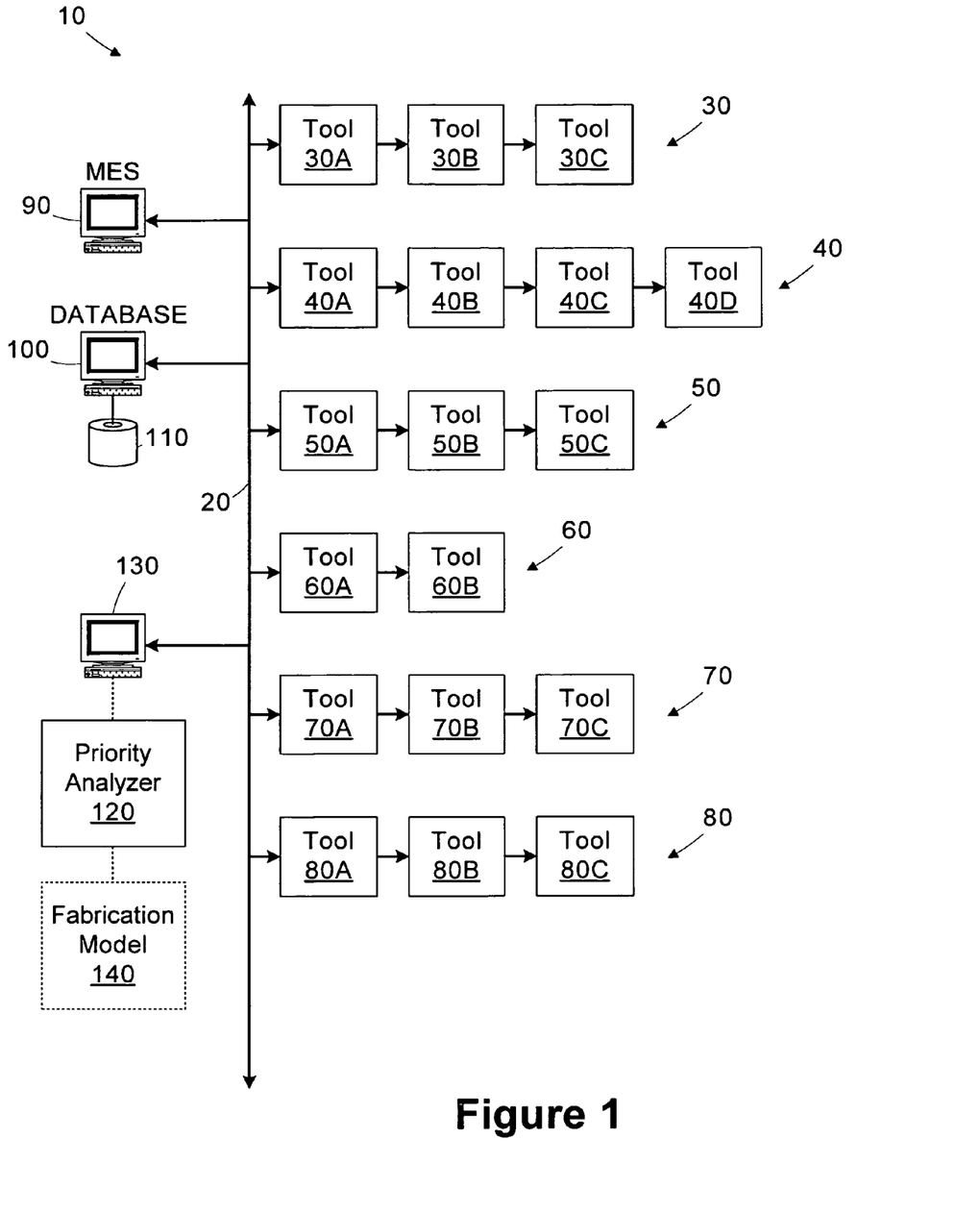
FIG. 1 is a simplified block diagram of a manufacturing system in accordance with one illustrative embodiment of the present invention.

Referring now to the drawings wherein like reference numbers correspond to similar components throughout the several views and, specifically, referring to FIG. 1, the present invention shall be described in the context of an illustrative manufacturing system 10. The manufacturing system 10 includes a network 20, a plurality of tools 30-80, a manufacturing execution system (MES) server 90, a database server 100 and its associated data store 110, and a priority analyzer 120 executing on a workstation 130.

In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other devices. The techniques may also be applied to workpieces or manufactured items other than semiconductor devices.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The network 20 interconnects various components of the manufacturing system 10, allowing them to exchange information. Each of the tools 30-80 may be coupled to a computer (not shown) for interfacing with the network 20. The tools 30-80 are grouped into sets of like tools, as denoted by lettered suffixes. For example, the set of tools 30A-30C represent tools of a certain type, such as a chemical mechanical planarization (CMP) tool.

A particular wafer or lot of wafers progresses through the tools 30-80 as it is being manufactured, with each tool 30-80 performing a specific function in the process flow. Exemplary processing tools for a semiconductor device fabrication environment include metrology tools, photolithography steppers, etch tools, deposition tools, polishing tools, rapid thermal processing tools, implantation tools, etc. The tools 30-80 are illustrated in a rank and file grouping for illustrative purposes only. In an actual implementation, the tools 30-80 may be arranged in any physical order or grouping. Additionally, the connections between the tools in a particular grouping are meant to represent connections to the network 20, rather than interconnections between the tools 30-80.

The manufacturing execution system (MES) server 90 directs the high level operation of the manufacturing system 10. The MES server 90 monitors the status of the various entities in the manufacturing system 10 (i.e., lots, tools 30-80) and controls the flow of articles of manufacture (e.g., lots of semiconductor wafers) through the process flow. The database server 100 stores data related to the status of the various entities and articles of manufacture in the process flow using one or more data stores 110. The data may include pre-process and post-process metrology data, tool states, lot priorities, etc.

The MES server 90 stores information in the data store 110 related to the particular tools 30-80 (i.e., or sensors (not shown) associated with the tools 30-80) used to process each lot of wafers. As metrology data is collected related to the lot, the metrology data and a tool identifier indicating the identity of the metrology tool recording the measurements is also stored in the data store 110. The metrology data may include feature measurements, process layer thicknesses, electrical performance, surface profiles, etc. Data stored for the tools 30-80 may include chamber pressure, chamber temperature, anneal time, implant dose, implant energy, plasma energy, processing time, etc. Data associated with the operating recipe settings used by the tool 30-80 during the fabrication process may also be stored in the data store 110. For example, it may not be possible to measure direct values for some process parameters. These settings may be determined from the operating recipe in lieu of actual process data from the tool 30-80.

The distribution of the processing and data storage functions amongst the different computers 90, 100, 130 is generally conducted to provide independence and a central information store. Of course, different numbers of computers and different arrangements may be used. Moreover, the functions of some units may be combined. For example, the MES server 90 and the priority analyzer 120 may be combined into a single unit.

As will be described in greater detail below, the priority analyzer 120 actively determines and updates the priority of various lots processed in the manufacturing system 10. The lot priorities are determined using a simulation-based, objective driven approach to determine optimal lot priority based on the required lot delivery times. Generally, the priority analyzer 120 determines lot priorities considering the current levels of work-in-process (WIP) and other requests at particular operations. Lot priorities are assigned at the highest level necessary to complete the processing by the required delivery time, while keeping the number of highest priority lots within limits and reducing the effects on other lots. Rather than having a fixed priority for all operations, the priority of a given lot may be determined independently for each remaining operation in its fabrication process.

The priority analyzer 120 employs a fabrication simulation model 140 of the fabrication facility for determining the effects of priority changes on the estimated completion time of a particular lot. The priority analyzer 120 is refreshed periodically to retrieve the latest WIP information of the manufacturing system 10, including the current operation of particular lots. The priority analyzer 120, in turn, refreshes the fabrication simulation model 140. The fabrication simulation model 140 also includes the latest tool availability and production flow information. The fabrication simulation model 140 may be implemented using commercially available software, such as AutoSched AP™, offered by Brooks Automation, Inc. of Chelmsford, Mass.

The priority analyzer 120 may be invoked for various reasons, such as after a modification to a target completion time for a lot and/or at predetermined intervals. For example, the priority analyzer 120 may be invoked whenever a lot completion time is modified and also every 20 minutes.

Figure 2:
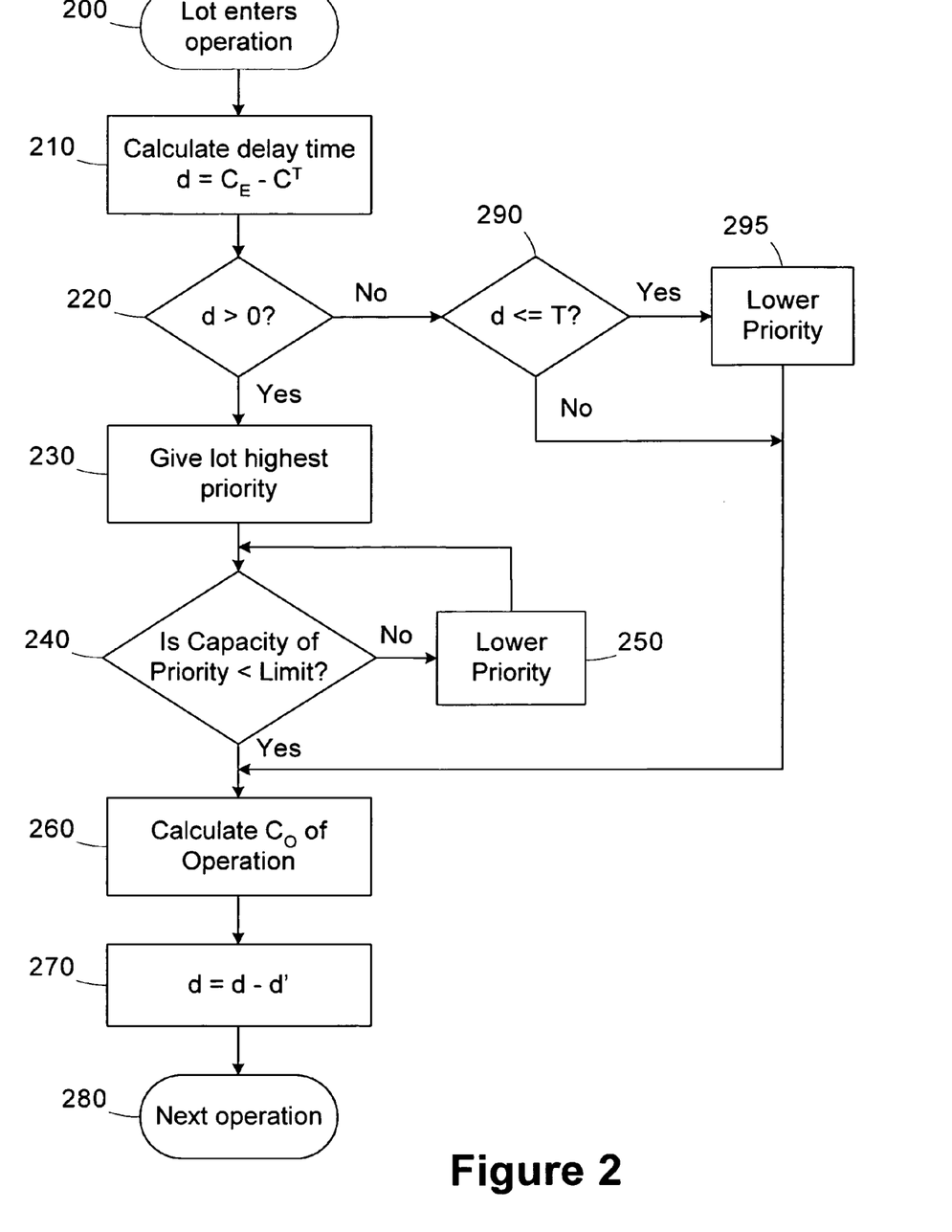
FIG. 2 is a simplified flow diagram of a method for controlling priority in accordance with another aspect of the present invention.

Referring now to FIG. 2, a simplified flow diagram of a method employed by the priority analyzer 120 in controlling lot priority is provided. In block 200, a particular lot enters an operation (i.e., the next step in its fabrication). In block 210, an estimated delay time, d, for the particular lot is calculated based on the difference between the estimated completion time, $C_E$, with its current priority, and target completion time, $C^T$ (i.e., to completely fabricate the lot). The estimated completion time is determined using the fabrication simulation model 140 based on the priority of particular the lot at each operation in view of the other lots being fabricated and their associated priorities. As will be described in greater detail below, the fabrication simulation model 140 models detailed interactions between tools 30-80 and lots, including the effects of tool reservations and lot processing selections.

In block 220, if the delay time is positive (i.e., the particular lot is behind schedule with respect to its target completion time), the particular lot is given the highest possible priority for that operation. Generally, a positive delay time denotes a lot that is behind schedule and a negative delay time indicates a lot that is ahead of schedule. The particular number of priority levels may vary depending on the particular embodiment. Exemplary priority levels, in order of increasing priority, include standard, low, medium, high, and highest. For each priority level, with the exception of standard priority, the priority analyzer 120 maintains a limit value that defines the number of lots that may be assigned the particular priority.

If the capacity of a particular priority level exceeds the predetermined limit in block 240, the priority of the particular lot is lowered in block 250, and the limit check for the particular lot at the next lower priority is repeated in block 240. The limit checking performed in blocks 240 and 250 is repeated until a priority level with available capacity is identified.

In block 260, the estimated completion time of the current operation, $C_O$, is determined based on the priority assigned in block 240, and the delay time, d, is updated based on the recovered time, d'. The priority analyzer 120 evaluates the next operation for the particular lot in block 280 by repeating the process of FIG. 2 to attempt to further reduce the delay time by adjusting the priorities for subsequent operations.

Returning to block 220, if the delay time is less than a threshold, T, the lot priority may be reduced in block 295. Because the delay time is negative, the lot is ahead of schedule and its priority may be lowered to allow other lots that are behind schedule to recover additional time. Also, lowering the lot priority to reduce its earliness reduces negative impacts to other lots, as the lot may no longer require tool reservations. The particular threshold value may vary depending on the particular implementation. For example, the threshold may be set at one hour, one shift, one day, one week, etc. The value is set to provide stability, such that a lot that is ahead of schedule can transfer some of its priority to another lot that is behind, but not so low as to cause the adjusted lot to fall back behind or to oscillate between being ahead and being behind. The threshold value also helps reduce the number of priority turnovers. Since lots of highest priority need a special cassette, adjusting lots to or from the highest priority require manually moving wafers to a wafer sorter to transfer wafers to or from the special cassette. Reducing the number of turnovers will improve the efficiency and reduce the dedicated human resources. The estimated completion time of the current operation, $C_O$, is determined in block 260 based on the priority assigned in block 295, and the delay time, d, is updated based on the lost time, d' (i.e., d' is negative).

The priority determination illustrated in FIG. 2 generally allows the priority analyzer 120 to adjust priorities of various lots to shift priority from lots that are ahead of schedule to those that are behind schedule. The fabrication simulation model 140 considers all the entities in the manufacturing system 10, and by nature, will evaluate the correlation with other priority lots within the same simulation run.

The use of the fabrication simulation model 140 allows the priority analyzer 120 to consider detailed tool modeling, such as the effects of reserving downstream tools 30-80. For example, when a priority lot enters a new operation, the priority analyzer 120 refreshes the remaining schedules for the lot and then looks at all future operations. For each future operation with idle tools 30-80, if the next estimated available time of an idle tool 30-80 after starting a new lot is beyond the estimated arrival time of the priority lot, the tool 30-80 is reserved. Similarly, for a particular tool 30-80, the priority analyzer 120, evaluates its relation with incoming priority lots when the tool 30-80 is available. If the tool 30-80 cannot be available when the priority lot arrives, it will not process its next lot and will remain idle to wait for the priority lots.

The following examples describe reservation rules that may be applied to priority lots or tools 30-80 processing priority lots. These rules typically take precedence over normal scheduling rules employed to make processing decisions, including batch rules, setup rules, etc. As these normal rules are well known to those of ordinary skill in the art, they are not detailed further herein for ease of illustration and to avoid obscuring the instant invention. Also, the following examples of reservation techniques may be performed for individual tools 30-80, individual lots, or to multiple tools 30-80 or lots simultaneously. The language employed below is not intended to limit the scheduling techniques to any particular scope of coverage.

Figure 3:
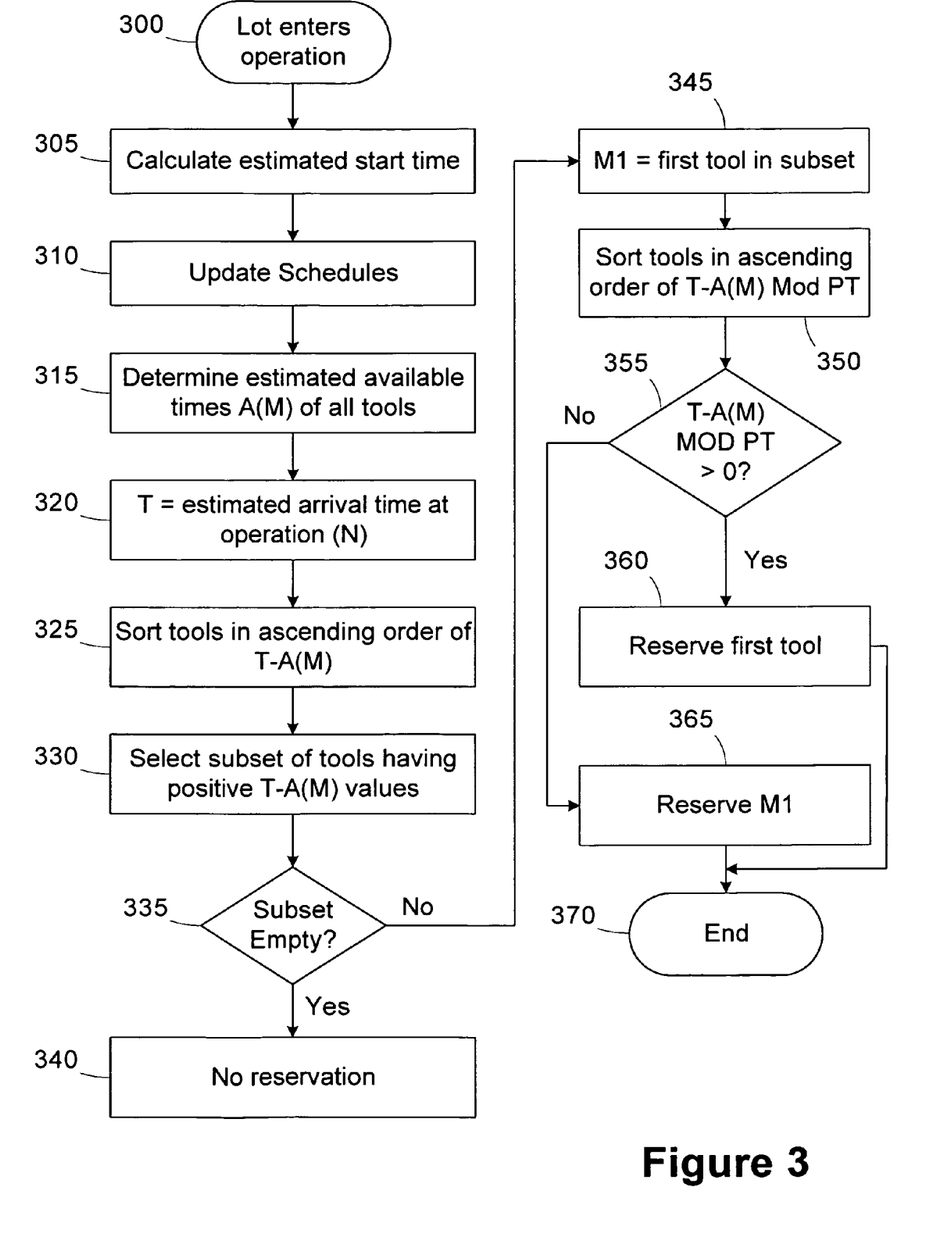
FIG. 3; is a simplified flow diagram of a method for making tool reservations.

FIG. 3 illustrates a tool reservation technique incorporated into the logic of the fabrication simulation model 140 for simulating the operation of the manufacturing system 10. In block 300, a particular lot enters an operation. As indicated above, the method of FIG. 3 may be implemented for multiple lots simultaneously. In block 305, an estimated start time for the lot (i.e., when the lot is available) is determined using the fabrication simulation model 140, and the schedules for the lots are updated in block 310.

In block 315, the estimated availability times, A(M), of all tools 30-80 capable of performing the required operation are determined, and the estimated arrival time, T, at operation (N) is determined in block 320. The metric T-A(M) represents the time difference between the arrival time of the lot and the availability time of the tool 30-80. In block 325, the tools 30-80 are sorted in ascending order of T-A(M), and the subset of tools 30-80 with positive values of T-A(M) is selected in block 325 (i.e., those tools 30-80 that are available before the arrival of the lot). If the subset of available tools 30-80 is empty in block 335 (i.e., no tools 38-80 are available), no reservation is made in block 340.

Given the subset of available tools 30-80 is not empty in block 335, M1 is designated as the first tool in the subset in block 345. Hence, M1 represents the tool that becomes available closest to the time that the lot is ready for the operation. Even though the tool is the first available, there still might be time available for the tool 38-80 to process a different lot prior to the arrival of the lot seeking to make a reservation. The time necessary to process another lot is designated as PT. In block 350, the metric, T-A(M) MOD PT (i.e., where MOD represents the modular division or modulo remainder function), is determined and the subset is sorted in ascending order of this metric. The resultant order represents the tools 30-80 that will be available when the lot is ready to be processed but still have time to process one or more lots. Sorting the subset in ascending order orders the tools 30-80 with the least dead time between the processing of another lot and the arrival of the subject lot.

If at least one tool 30-80 has a positive values of T-A(M) MOD PT in block 355, the first tool with a positive value of T-A(M) MOD PT is reserved in block 360. If no tools 30-80 have positive values of T-A(M) MOD PT in block 355, the default tool, M1, is reserved (i.e., the tool 30-80 available closest to the arrival time of the lot). The method terminates in block 370 after the reservations completed in blocks 360 or 365.

Figure 4:
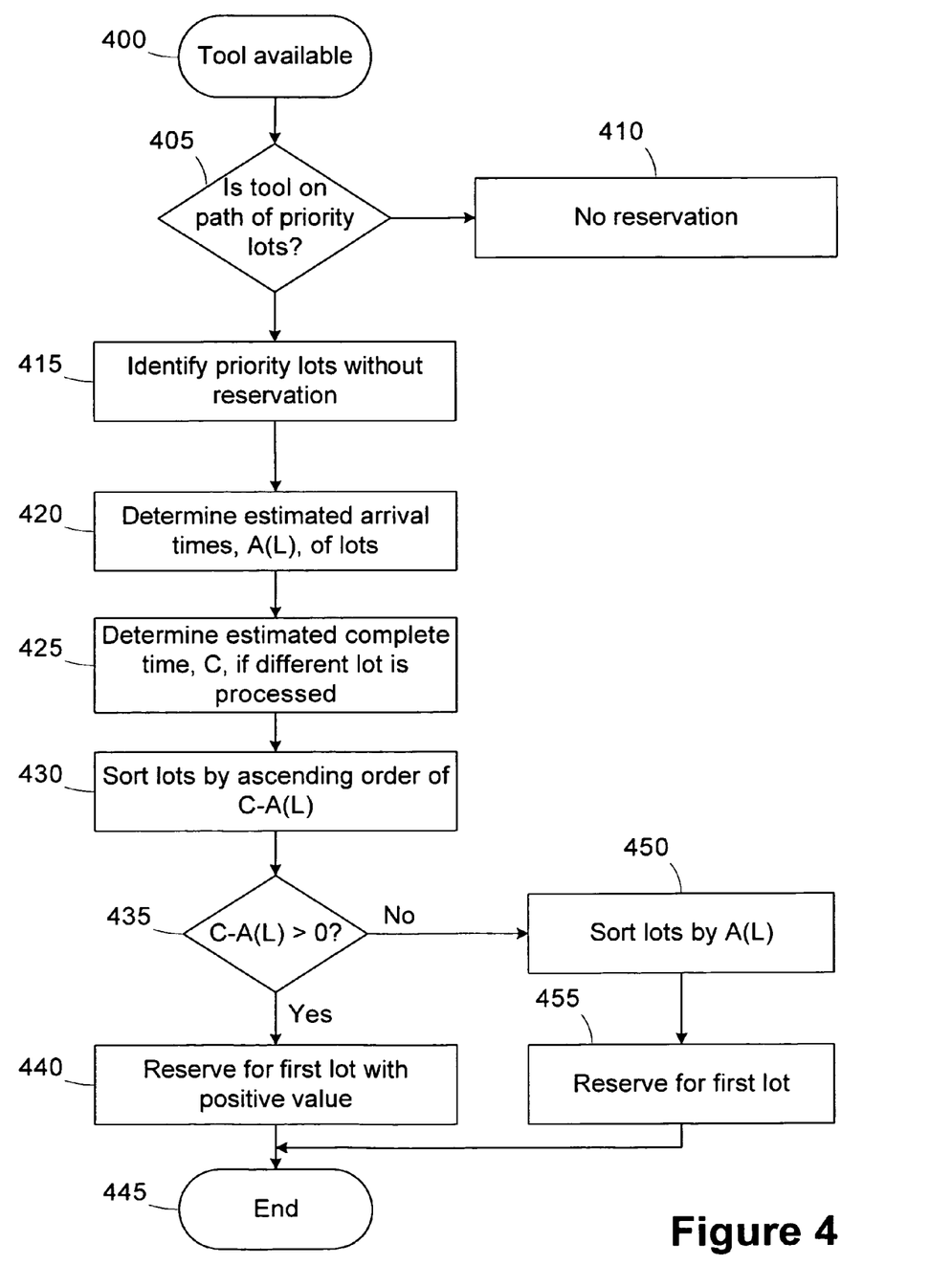
FIG. 4 is a simplified flow diagram of a method selecting the next lot to process when the tool becomes available and is in the path of lots designated as priority lots.

Turning now to FIG. 4, a simplified flow diagram of a method modeled by the fabrication simulation model 140 and implemented for one of the tools 30-80 for selecting the next lot to process when the tool 30-80 becomes available and is in the path of lots designated as priority lots.

A tool 30-80 becomes available in block 400. If the tool 30-80 is not on the path of any priority lots (i.e., priority>non-critical) in block 405, no reservation is created in block 410, and the method terminates. If no priority lots are identified, normal scheduling rules are applied to determine which lot(s) to process next.

If the tool 30-80 is in the path of priority lots in block 405, those lots without reservations (i.e., within the station family for the needed operation) are identified in block 415, and the estimated arrival times of the priority lots, A(L), are determined using the fabrication simulation model 140 in block 420. In block 425, the estimated completion time, C, for the tool 30-80 if it were to process a different lot is determined.

The metric C-A(L) represents the time difference between when the tool 30-80 is available after processing a different lot and the arrival times of the priority lots. In block 430, the priority lots are sorted by ascending order of C-A(L), where the first lots in the sorted list represents the lot with the least amount of time difference between the lot arrival and the tool completion time. If at least one of the lots has a positive C-A(L) value in block 435, a reservation for the first lot with a positive value is made in block 440, and the method terminates in block 445.

If none of the lots has a positive C-A(L) value in block 435, the lots are assorted by arrival time, A(L), in block 450, and a reservation for the first arriving lot is made in block 455. Again, the method terminates in block 445.

The reservation rules illustrated in FIGS. 3 and 4 attempt to reduce the impact of reservations made for priority lots on the other lots being fabricated by identifying the scenarios with the least amount of tool idle time between lot arrival and tool availability. These rules are incorporated into the fabrication simulation model 140, and thereby allow the priority analyzer 120 to more efficiently simulate the estimated completion times for comparison to the target completion times, as illustrated in FIG. 2. The priority adjustment technique illustrated in FIG. 2 cooperates with the reservation rules illustrated in FIGS. 3 and 4 to attempt to allow priority lots to be finished in accordance with their target completion times, while also attempting to minimize the disruption of the processing flow for other, non-priority lots. The priority of a lot that is behind schedule may be increased automatically by the priority analyzer 120, but only to the level that is required to make up the delay time. As the lot or other lots gain or lose time, their relative priorities can be automatically adjusted to increase the likelihood of all of them getting completed on time. These techniques increase the utilization and efficiency of the manufacturing system 10, thereby increasing throughput and profitability.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for processing workpieces in a process flow including a plurality of operations, comprising:
    employing a fabrication simulation model of the process flow to determine an estimated completion time for at least one selected workpiece, the fabrication simulation model simulating the processing of the selected workpiece and other workpieces in the process flow through the plurality of operations; and
    adjusting a priority of the selected workpiece for a current operation and at least one future operation based on a comparison between a target completion time for the selected workpiece and the estimated completion time.

2. The method of claim 1, wherein adjusting the priority further comprises assigning a discrete priority for each operation remaining for the selected workpiece, at least two of the discrete priorities being different.

3. The method of claim 1, wherein adjusting the priority includes increasing the priority of the selected workpiece for one of the current operation or the future operation responsive to the estimated completion time being later than the target completion time.

4. The method of claim 3, wherein increasing the priority for one of the current operation or the future operation further comprises:
    assigning the selected workpiece a highest priority selected from a plurality of priority levels;
    reducing the priority of the selected workpiece to the next highest priority level responsive to determining that a number of workpieces having the assigned priority level exceeds a predetermined threshold associated with the priority level; and
    repeating reducing until the number of workpieces having the assigned priority level does not exceed the predetermined threshold for the priority level.

5. The method of claim 1, wherein adjusting the priority includes lowering the priority of the selected workpiece for one of the current operation or the future operation responsive to the estimated completion time being earlier than the target completion time.

6. The method of claim 5, wherein adjusting the priority includes lowering the priority of the selected workpiece for one of the current operation or the future operation responsive to the estimated completion time being earlier than the target completion time by a predetermined threshold.

7. The method of claim 1, further comprising processing additional workpieces in the process flow, including the selected workpiece, in accordance with the adjusted priority.

8. The method of claim 1, wherein employing the fabrication simulation model further comprises making reservations for priority workpieces including the selected workpiece for at least one future operation.

9. The method of claim 8, wherein the process flow includes a plurality of tools, and making the reservations further comprises:
   determining tool availability times using the fabrication simulation model;
   determining an arrival time for a selected priority workpiece using the fabrication simulation model;
   reserving a tool for a selected priority workpiece based on the tool availability times and the arrival time.

10. The method of claim 9, wherein reserving the tool further comprises:
   determining a first metric for each tool based on a comparison between the arrival time and the tool availability time;
   selecting a first subset of the tools having positive first metric values; and
   reserving at least one of the tools in the first subset for the selected priority workpiece.

11. The method of claim 10, further comprising reserving the tool in the first subset having the smallest positive value of the first metric for the selected priority workpiece.

12. The method of claim 10, further comprising:
   determining a second metric based on a modular division function of the first metric and a processing time of the tool; and
   reserving a tool in the first subset having a smallest positive value of the second metric.

13. The method of claim 8, wherein employing the fabrication simulation model further comprises making reservations for tools in a path of priority workpieces including the selected workpiece.

14. The method of claim 8, wherein the process flow includes a plurality of tools, and making the reservations further comprises:
   determining arrival times of priority workpieces using the fabrication simulation model;
   determining an estimated completion time for a selected tool using the fabrication simulation model; and
   reserving the selected tool for a selected priority workpiece based on the workpiece arrival times and the estimated completion time.

15. The method of claim 14, wherein reserving the selected tool further comprises:
   determining a first metric for each priority workpiece based on a comparison between the estimated completion time and the workpiece arrival time; and
   reserving the selected tool for the priority workpiece having a smallest positive value of the first metric.

16. The method of claim 15, further comprising
   determining that no priority workpiece has a positive value of the first metric; and
   reserving the selected tool for the priority workpiece having the soonest arrival time.

17. The method of claim 1, further comprising employing the fabrication simulation model and adjusting the priority for one of the current operation or the future operation responsive to a change in the target completion time for the selected workpiece.

18. The method of claim 1, further comprising employing the fabrication simulation model and adjusting the priority at periodic time intervals.

19. A system, comprising:
   a plurality of tools for processing workpieces in a process flow including a plurality of operations; and
   a priority analyzer operable to employ a fabrication simulation model of the process flow to determine an estimated completion time for at least one selected workpiece, the fabrication simulation model simulating the processing of the selected workpiece and other workpieces in the process flow through the plurality of operations, wherein a priority analyzer adjusts the priority of the selected workpiece for a current operation and at least one future operation based on a comparison between a target completion time for the selected workpiece and the estimated completion time.

20. The system of claim 19, wherein the priority analyzer is operable to assign a discrete priority for each operation remaining for the selected workpiece, at least two of the discrete priorities being different.

21. The system of claim 19, wherein the priority analyzer is operable to increase the priority of the selected workpiece for one of the current operation or the future operation responsive to the estimated completion time being later than the target completion time.

22. The system of claim 19, wherein the priority analyzer is operable to lower the priority of the selected workpiece for one of the current operation or the future operation responsive to the estimated completion time being earlier than the target completion time.

23. The system of claim 19, further comprising a manufacturing execution system operable to direct processing of additional workpieces in the process flow, including the selected workpiece, in accordance with the adjusted priority.

24. The system of claim 19, wherein the priority analyzer is operable to employ the fabrication simulation model to make reservations for priority workpieces including the selected workpiece for at least one future operation.

25. The system of claim 19, wherein the priority analyzer is operable to employ the fabrication simulation model and adjust the priority for one of the current operation or the future operation responsive to a change in the target completion time for the selected workpiece.

26. The system of claim 19, wherein the priority analyzer is operable to employ the fabrication simulation model and adjust the priority at periodic time intervals.

27. A system for processing workpieces in a process flow including a plurality of operations, comprising:
   means for simulating the processing of at least one selected workpiece and other workpieces in the process flow through the plurality of operations to determine an estimated completion time for the selected workpiece; and
   means for adjusting a priority of the selected workpiece for a current operation and at least one future operation based on a comparison between a target completion time for the selected workpiece and the estimated completion time.

* * * * *